(12) United States Patent
Jain

(10) Patent No.: US 7,486,723 B2
(45) Date of Patent: *Feb. 3, 2009

(54) ASYMMETRICAL DIGITAL SUBSCRIBER LINE SYSTEM WITH IMPROVED DATA RATE

(75) Inventor: Raj Kumar Jain, Singapore (SG)

(73) Assignee: Infineon Technologies Aktiengesellschaft, Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 11/696,735

(22) Filed: Apr. 5, 2007

(65) Prior Publication Data

US 2007/0183456 A1     Aug. 9, 2007

Related U.S. Application Data

(63) Continuation of application No. 10/161,379, filed on Jun. 3, 2002, now Pat. No. 7,209,516.

(60) Provisional application No. 60/376,300, filed on Apr. 29, 2002.

(51) Int. Cl.
*H04B 3/38* (2006.01)
*H04J 1/00* (2006.01)
*H04M 1/00* (2006.01)

(52) U.S. Cl. .................. 375/222; 370/485; 379/399.01

(58) Field of Classification Search ............... 375/219, 375/222, 377; 370/286, 431, 464, 480, 482, 370/484, 485; 379/399.01, 406.01
See application file for complete search history.

(56) References Cited

U.S. PATENT DOCUMENTS

| | | | | |
|---|---|---|---|---|
| 5,812,786 | A | * | 9/1998 | Seazholtz et al. ........... 709/233 |
| 6,741,604 | B1 | * | 5/2004 | Rippin et al. ............... 370/431 |
| 2002/0085640 | A1 | * | 7/2002 | Humphrey .................. 375/260 |
| 2002/0140572 | A1 | * | 10/2002 | Gardner et al. ........... 340/853.3 |

FOREIGN PATENT DOCUMENTS

| EP | 1 079 578 A2 | * | 2/2001 |
|---|---|---|---|
| WO | WO 99/65218 | * | 12/1999 |
| WO | WO 00/39977 A1 | | 7/2000 |

OTHER PUBLICATIONS

ETSI TC TM WG TM6(02) 2, ETSI Technical Committee, Working Group TM6, Access Networks, Report of Meeting 26, Apr. 22-26, 2002.

* cited by examiner

*Primary Examiner*—Young T. Tse
(74) *Attorney, Agent, or Firm*—Horizon IP Pte Ltd

(57) ABSTRACT

An improved ADSL system with improved data rate is disclosed. In one embodiment, the upstream data bit rate is increased by extending the upstream transmission band. In another embodiment, the downstream data is also increased by extending the downstream transmission band.

29 Claims, 5 Drawing Sheets

ASYMMETRICAL DIGITAL SUBSCRIBER LINE SYSTEM WITH IMPROVED DATA RATE

CROSS REFERENCES TO RELATED APPLICATIONS

This application is a Continuation application which claims benefit of U.S. patent application Ser. No. 10/161,379, now U.S. Pat. No. 7,209,516, filed Jun. 3, 2002, which claims benefit of U.S. patent application Ser. No. 60/376,300 filed Apr. 29, 2002. These applications are hereby incorporated by reference in their entireties.

FIELD OF THE INVENTION

The present invention relates generally to asymmetrical digital subscriber line systems. More particularly, the invention relates to asymmetrical digital subscriber line transceivers with improved data rate.

BACKGROUND OF THE INVENTION

To more effectively utilize the frequency bandwidth of telephone lines (e.g., copper wires) for data transmission, ADSL systems have been developed. ADSL utilizes a multi-carrier technique called Discrete Multi-Tone (DMT) for data transmission. DMT separates the available bandwidth into many channels or carriers for transmission of data. Each channel uses Quadrature Amplitude Modulation (QAM) to carry about 1-15 bits/channel. The signals in each channel are modulated before transmission and demodulated on the other end.

The transmission capability of the individual channels is evaluated for each connection. The bits of data to be transmitted in the ADSL system are grouped into symbols. The data is assigned to the available channels, depending on the number of bits each channel or subcarrier can transmit. A frequency domain vector set is created by encoding the channels. The frequency domain vectors are modulated and converted to digital time domain information by an inverse discrete fourier transform (IDFT).

FIG. 1 shows a frequency spectrum of a conventional ADSL system over plain old telephone service (POTS). Voice transmission is located at the lower 4 kHz band. From 4 kHz to 1.1 MHz, 256 channels of 4.3125 KHz each are provided. The first 5 channels (from 4-26 kHz) are usually not used for data transmission. For frequency division multiplexed systems (FDM), transmission of data is limited to channels 7 to 256. The transmission band is separated into first and second portions 140 and 160, which are use for upstream (from the end user) and downstream (to the end user) communication. The first portion ranges from 25.875 kHz to 138 kHz (e.g., channels 7-32) while the second portion ranges from 138 kHz to 1.1. MHz (e.g., remaining 224 channels). Typically, the subcarrier at Nyguist frequency is not used for data transmission. For ADSL systems over ISDN, transmission of data begins at 138 kHz (or 120 kHz depending on system characteristics) instead of 25.875 kHz, as shown in FIG. 2. The upstream portion 140 comprises 26 channels. However, due to the fact that data upstream transmission is shifted to a higher frequency, the downstream portion 160 comprises 192 channels instead of 224.

The data bandwidth of conventional ADSL systems over POTS is about 1.1 MHz. As data transfer requirements become more voluminous and complex, there is a demand to further increase the data bandwidth of conventional ADSL systems.

SUMMARY OF THE INVENTION

The invention relates to an asymmetrical digital subscriber line system with improved upstream data bit rate. The asymmetrical digital subscriber line system comprises a frequency spectrum having a data transmission band from $F_{U0}$ to $F_{DE}$. The transmission band includes first and second sections, wherein the first section transmits upstream data from frequencies $F_{U0}$ to $F_{UE}$. The first section comprises first and second subsections. The first subsection being from $F_{U0}$ to $F_{U1}$ and has a plurality of upstream channels equal to the number a, where a is equal to the number of upstream channels in conventional asymmetrical digital subscriber line systems. The second subsection is from frequencies $F_{U1}$ to $F_{UE}$ and comprises x channels, where x is $\geq 1$ to increase the upstream data transmission rate. The second section transmits downstream data from frequencies $F_{D0}$ to $F_{DE}$ for FDM systems. In one embodiment, $F_{DE}$ is equal to 1.1 MHz, which is equal to the end of the data transmission band of conventional asymmetrical digital subscriber line systems. In another embodiment, $F_{DE}$ extends beyond 1.1 MHz, increasing the downstream data transmission rate.

DETAILED DESCRIPTION OF THE INVENTION

Figure 3:
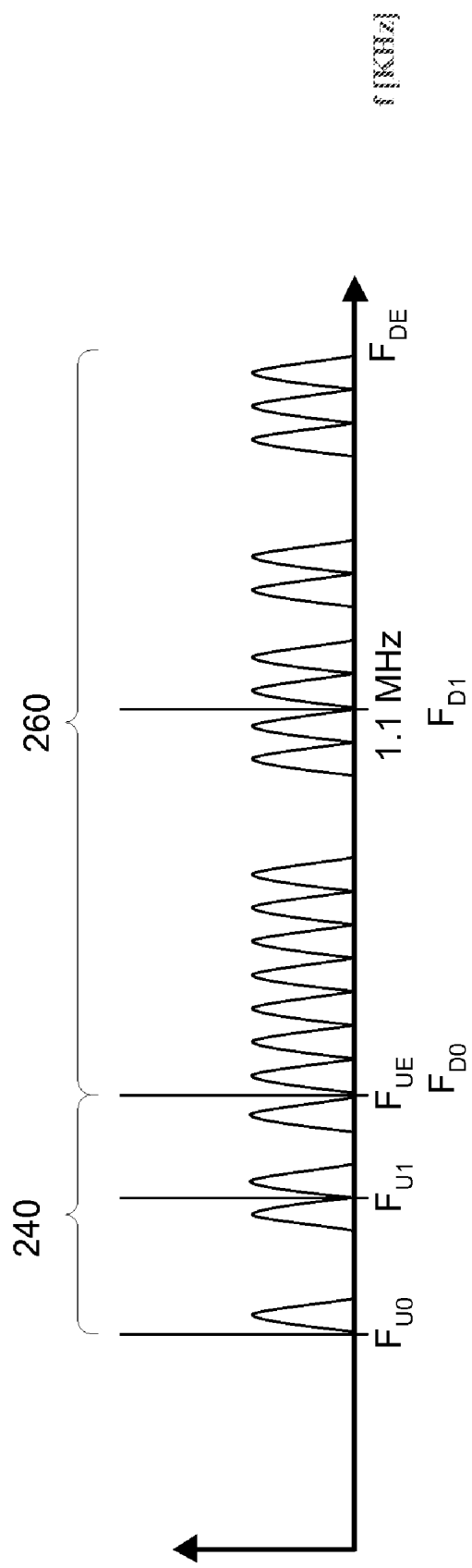
FIG. 3 shows a frequency spectrum of an ADSL system according to one embodiment of the invention.

FIG. 3 shows a frequency spectrum of an ADSL system in accordance with one embodiment of the invention. A technical specification of an ADSL system in accordance with one embodiment of the invention is included in appendix 1, which is herein incorporated by reference for all purposes. The ADSL system transmits data commencing at frequency $F_{U0}$. In some applications, frequencies below $F_{U0}$ are reserved for voice and data service. For example, POTS or ISDN typically reserves the lower frequency bands for voice/data communication (e.g., $F_{U0}$ for POTS is about 25.875 kHz and ISDN is about 120/138 kHz). Transmission of data at the lower frequency bands is also useful. For example, $F_{U0}$ can start at 0 (for ADL systems) or other frequencies. The data transmission band includes first and second portions 240 and 260 for transmitting data. In one embodiment, the first portion transmits upstream data and the second portion transmits downstream data.

In one embodiment, the first portion is from frequency $F_{U0}$ to $F_{UE}$ and comprises a+x channels, where a is equal to the number of upstream channels in conventional ADSL systems and x is greater than or equal to 1. For example, a is equal to 26 for POTS and 32 for ADL and ISDN services. The a number of upstream channels ends at $F_{U1}$. Preferably, $F_{U1}$ is at a frequency which has $2^n$ channels, where n is a whole number. More preferably, a+x ends at a frequency $F_{UE}$ having $2^n$ channels. For example, $F_{U1}$ is equal to about 138 kHz (32 or $2^5$ channels) for POTS and ADL applications and equal to 276 kHz (64 or $2^6$ channels) for ISDN applications. Providing x which extends $F_{UE}$ to other frequencies is also useful. For example, $F_{UE}$ can be extended to about 276 kHz or 552 kHz. The frequency range from $F_{U1}$ to $F_{UE}$ provides additional bandwidth for transferring upstream data, thus increasing the upstream data rate over conventional ADSL systems.

The second portion starts from $F_{D0}$ for transmission of downstream data. Preferably, $F_{D0}$ is contiguous with $F_{UE}$. In one embodiment, the second section is from $F_{D0}$ to $F_{D1}$, where $F_{D1}$ is equal to 1.1 MHz (256 or $2^8$ channels) which is equal to the end of the transmission band for conventional ADSL systems. Although the upstream data rate is increased, it is achieved at the expense of downstream data rate. In a preferred embodiment, the downstream transmission band is extended to $F_{DE}$ and comprises additional y channels to improve the downstream data rate. $F_{DE}$ is equal to $F_{D1}+(y\times 4.3125)$. For DMT systems, $F_{DE}$ is preferably equal to a frequency which results in 2z channels, where z is a whole number. More preferably, $F_{DE}$ is equal to about 2.2 MHz (e.g., 512 or 29 channels). Providing $F_{DE}$ equal to other frequencies is also useful. However, the higher $F_{DE}$ is, the more attenuation the higher frequency data exhibits for longer loop lengths.

Extending the transmission band beyond conventional ADSL systems can improve both upstream and downstream data rates. Increasing both upstream and downstream data rates is particularly useful for applications requiring data transfer to and from the end-users, such as interactive applications, video-conferencing, video phones, or video games.

Alternatively, both first and second portions transmit downstream data. Such an ADSL operating mode is referred to as "echo cancellation mode". In one embodiment, the ADSL system can be configured to operate in a full or partial echo cancellation mode. In the full echo cancellation mode, downstream data is transmitted in both the first and second portions. In the partial echo cancellation mode, only a segment of the first portion and the second portion transmit downstream data. For example, the x channels in the first portion (e.g., $F_{U1}$ to $F_{UE}$) and second portion are used to transmit downstream data.

A consideration in ADSL is the power used in transmitting a frame of information. If too much power is used, noise coupling can cause cross-talk with other lines which adversely impacts the integrity of the service. On the other hand, if not enough power is used, the signal may not reach the destination, particularly for longer loops due to attenuation. The power limits for data transmission is defined by the standard committee (T1.417), which is herein incorporated by reference for all purposes. According to the telecom standard T1.417, for spectral classes 5 and 9, the upper power limits for upstream (from about 25 kHz to about 138 kHz) and downstream (from about 138 kHz to 1104 kHz) data transmission in the frequency range are about 13 dBm and 20.9 dBm, respectively.

Figure 4:
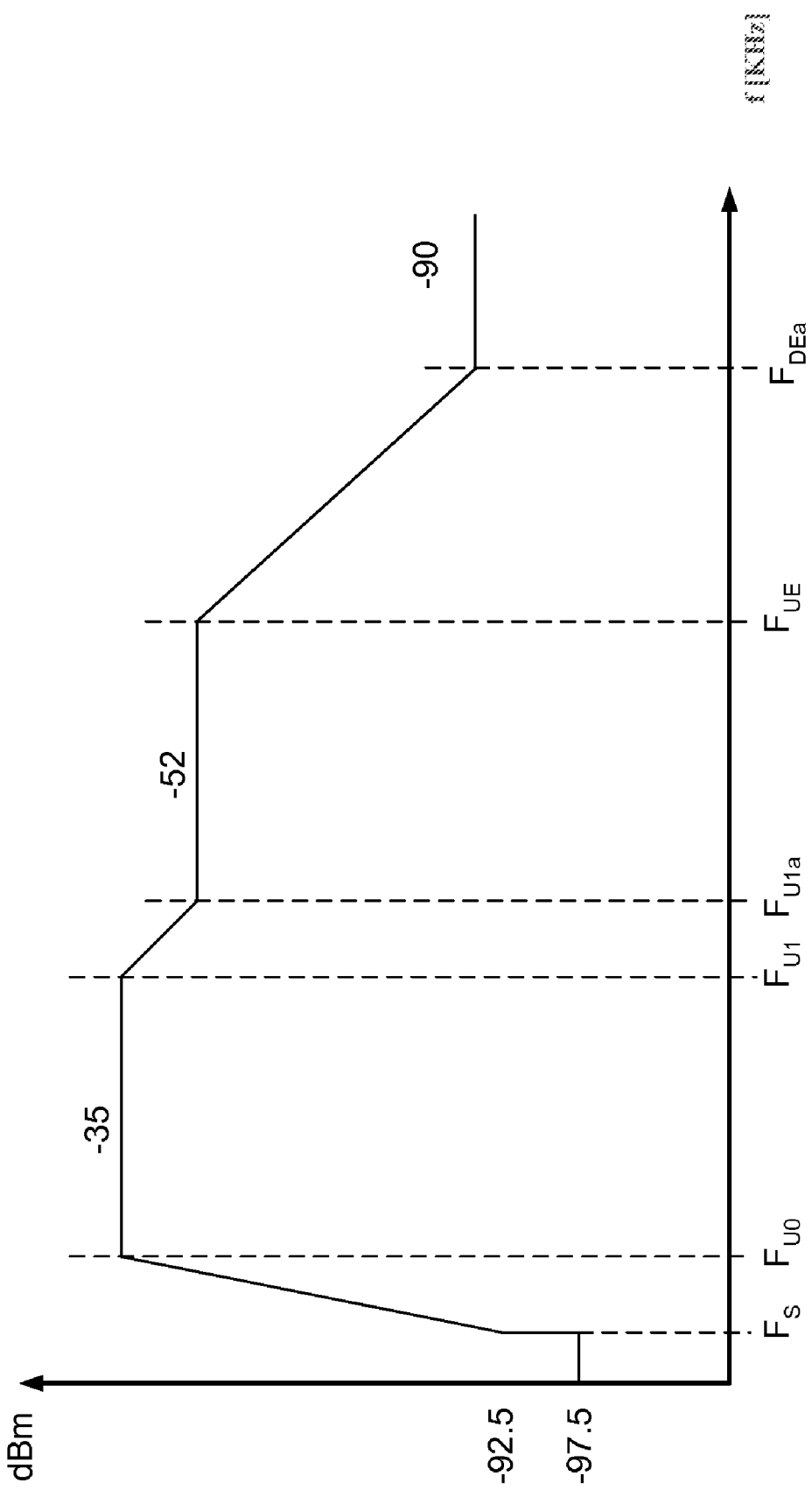
FIGS. 4-6 show power spectral density masks for upstream data transmission in accordance with various embodiments of the invention.
Figure 5:
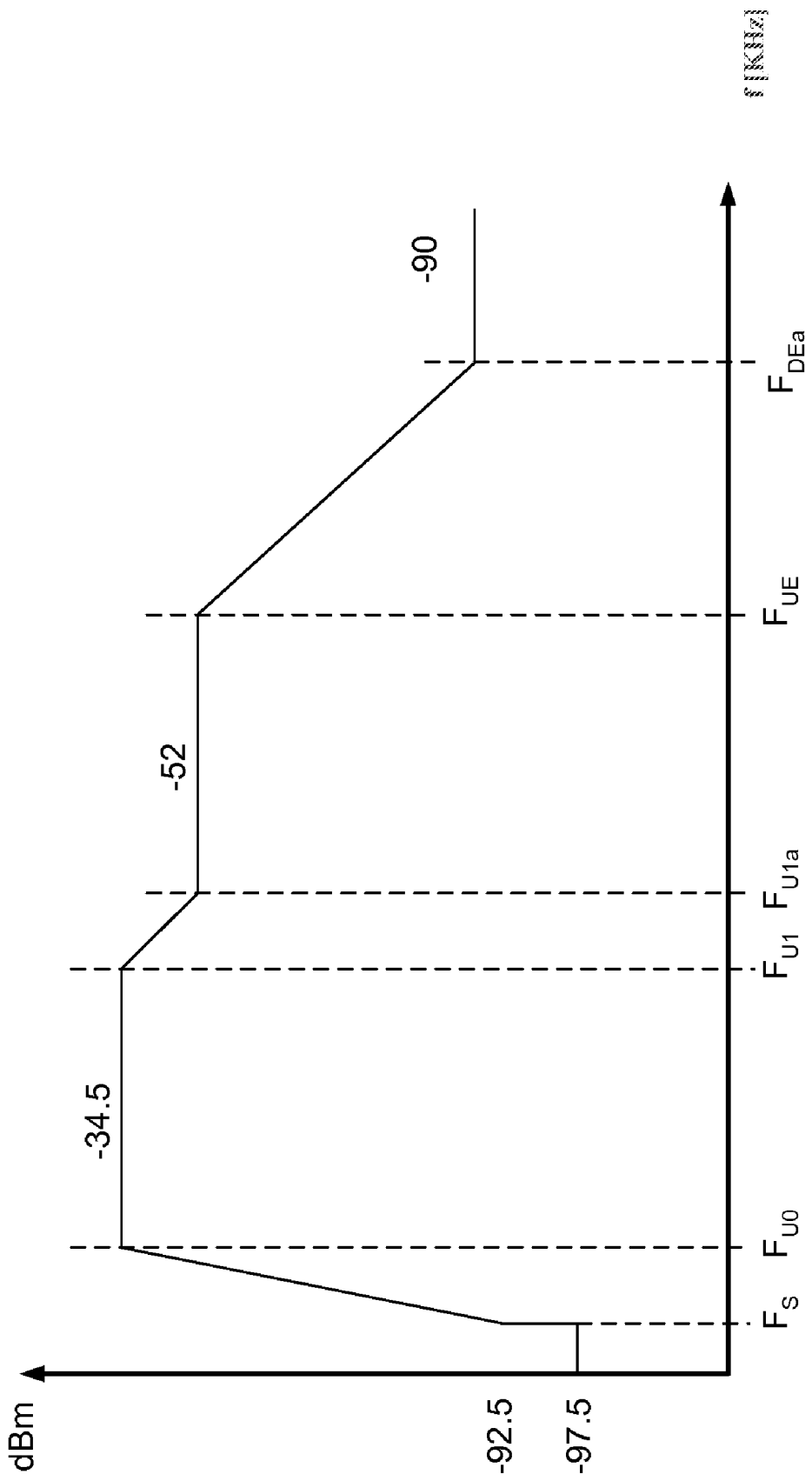

FIGS. 4-5 show power spectral density (PSD) masks used for upstream data transmission in accordance with various embodiments of the invention. Tables 1 and 2 show the frequency and power equations corresponding to the PSD masks of FIGS. 4 and 5, respectively. The PSD masks, in one embodiment, are shaped according to performance and power management requirements. Preferably, the PSD masks are shaped according to performance requirements while being compliant with the ADSL standards. Referring to the figures, the power from $F_{U0}$ to $F_{U1}$ is at a first power level and decreases to a second power level from $F_{U1}$. The second power level is maintained at the second power level until $F_{UE}$. At $F_{UE}$, the power is reduced to a third level which is sufficiently low to avoid any cross-talk or disturbance to other services. Depending on the applications, the power increase exhibited below $F_{U0}$ is from the end of the service band (e.g., 4 kHz for POTS, 120 kHz for ISDN, or 0 for ADL).

In a preferred embodiment, the rate of increase and decrease in power is substantially similar to that of conventional ADSL masks, increasing compatibility to conventional ADSL systems. For example, rate of decrease in power is equal to 48 dBm/octave while the rate of increase is 21.5 dBm/octave. Also, to maintain compatibility with conventional ADSL systems, the first power level is preferably maintained at a level as currently defined (e.g., −34.5 dBm as shown in FIG. 4) or slightly reduced (e.g., −35 dBm as shown in FIG. 5). Both PSD masks are within the power levels defined by ADSL standards (12.9 dBm for FIG. 4 and 12.5 dBm for FIG. 5).

TABLE 1

| FREQUENCY BAND f (kHz) (VALUES ARE FOR ADSL WITH POTS SERVICES WITH X = 32 CHANNELS) | EQUATION FOR LINE (dBm/Hz) |
| --- | --- |
| $0 < f < F_s$ (Fs = 4 kHz) | −97.5, with max power in the 0-Fs kHz band with increase from Fs = +5 dBm |
| $F_s < f < F_{U0}$ ($F_{U0} \approx 25.875$ kHz) | $-92.5 + 21.5 \times \log_2(f/F_s)$ |
| $F_{U0} < f < F_{U1}$ ($F_{U1} \approx 138$ kHz) | −35 |
| $F_{U1} < f < F_{U1a}$ ($F_{U1a} \approx 176.81$ kHz) | $-35 - 48 \times \log_2(f/F_{U1})$ |
| $F_{U1a} < f < F_{UE}$ ($F_{UE} \approx 276$ kHz) | −52 |
| $F_{UE} < f < F_{DEa}$ ($F_{DEa} \approx 478$ kHz) | $-52 - 48 \times \log_2(f/F_{UE})$ |
| $F_{DEa} < f < F_{DEb}$ ($F_{DEb} \approx 1221$ kHz) | −90 |
| $F_{DEb} < f < F_{DEc}$ ($F_{DEb} \approx 1630$ kHz) | −90 peak, with max power in the [f, f + 1 MHz] window of $(-90 - 48 \times \log_2(f/F_{DEb}) + 60)$ dBm |
| $F_{DEc} < f < F_{DEd}$ ($F_{DEd} \approx 11040$ kHz) | −90 peak, with max power in the [f, f + 1 MHz] window of −50 dBm |

TABLE 2

| FREQUENCY BAND f (kHz) (VALUES ARE FOR ADSL WITH POTS SERVICES WITH X = 32 CHANNELS) | EQUATION FOR LINE (dBm/Hz) |
| --- | --- |
| $0 < f < F_s$ (Fs = 4 kHz) | −97.5, with max power in the 0-Fs kHz band with increase from Fs = +5 dBm |
| $F_s < f < F_{U0}$ ($F_{U0} \approx 25.875$ kHz) | $-92.5 + 21.5 \times \log_2(f/F_s)$ |
| $F_{U0} < f < F_{U1}$ ($F_{U1} \approx 138$ kHz) | −34.5 |
| $F_{U1} < f < F_{U1a}$ ($F_{U1a} \approx 176.81$ kHz) | $-34.5 - 48 \times \log_2(f/F_{U1})$ |
| $F_{U1a} < f < F_{UE}$ ($F_{UE} \approx 276$ kHz) | −52 |
| $F_{UE} < f < F_{DEa}$ ($F_{DEa} \approx 478$ kHz) | $-52 - 48 \times \log_2(f/F_{UE})$ |
| $F_{DEa} < f < F_{DEb}$ ($F_{DEb} \approx 1221$ kHz) | −90 |
| $F_{DEb} < f < F_{DEc}$ ($F_{DEb} \approx 1630$ kHz) | −90 peak, with max power in the [f, f + 1 MHz] window of $(-90 - 48 \times \log_2(f/F_{DEb}) + 60)$ dBm |
| $F_{DEc} < f < F_{DEd}$ ($F_{DEd} \approx 11040$ kHz) | −90 peak, with max power in the [f, f + 1 MHz] window of −50 dBm |

Figure 6:
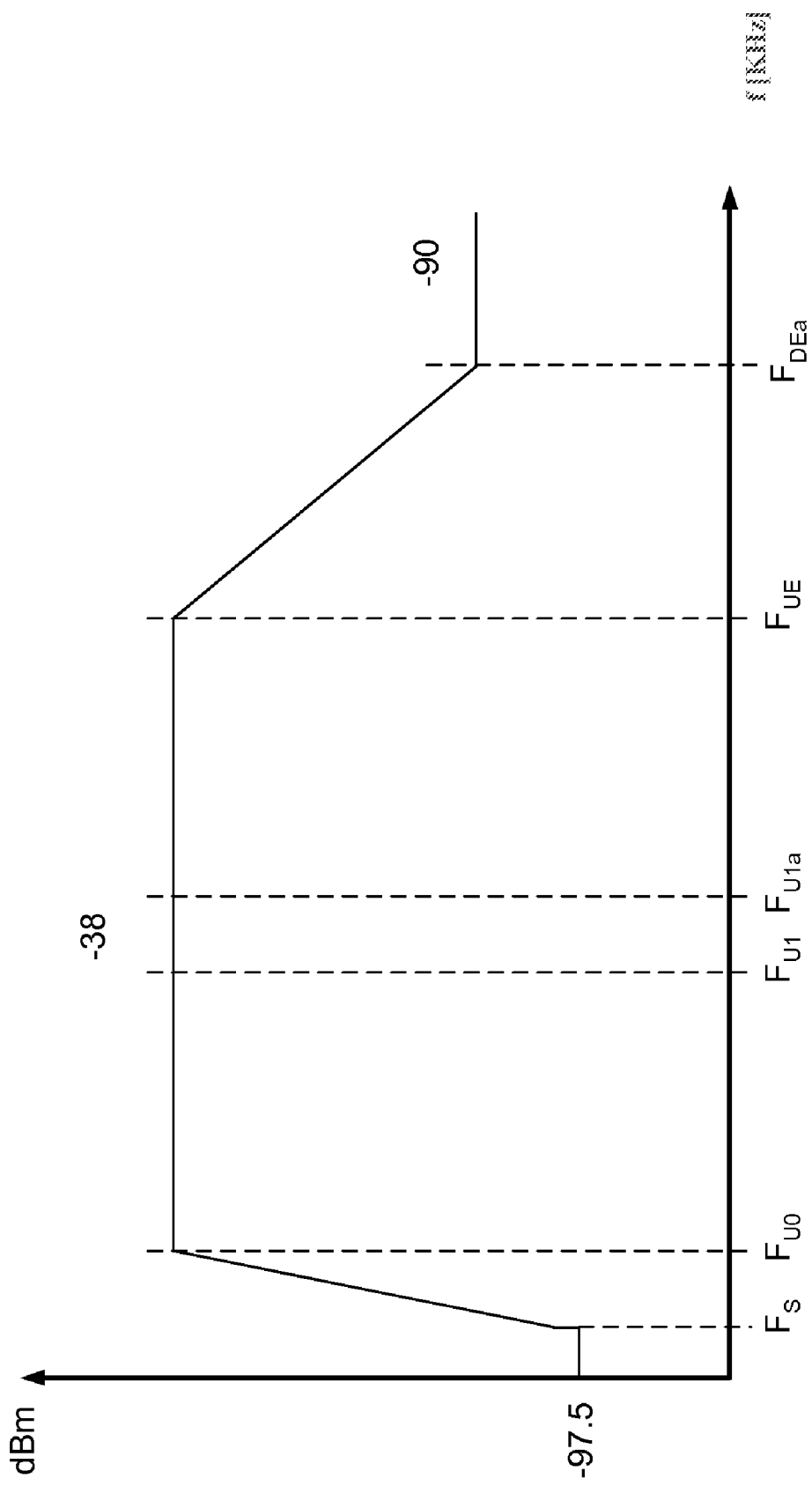

Providing other PSD masks for transmission of upstream data is also useful, for example, different power levels as well as different rates of increase and decrease. Alternatively, a PSD mask in which the first and second power levels are equal can be used for transmission of upstream data, as shown in FIG. 6. As an example, the power level can be set at −38 dBm. Other power levels can also be useful. Preferably, the power level is set to ensure that transmission in the upstream direction is with the limits defined by T1.417. For transmission of downstream data, PSD masks as described in, for example, ITU—Telecommunication Standardization Sector proposal titled "G.gen: G.dmt.bis: G.lite.bis: ADSL+" Texas Instrument, March 2002, which is incorporated by reference for all purposes, can be used.

While the invention has been particularly shown and described with reference to various embodiments, it will be recognized by those skilled in the art that modifications and changes may be made to the present invention without departing from the spirit and scope thereof. The scope of the invention should therefore be determined not with reference to the above description but with reference to the appended claims along with their full scope of equivalents.

APPENDIX 1

1 Introduction

An ADSL system with improved upstream performance of ADSL systems (e.g., ADSL+, ADSL.dmt, G.dmt.bis). In one embodiment, the upstream ADSL data rate is increased. The increase in upstream data is advantageous for shorter loops, such as for home offices and for residential line. Conventionally, the Annex A and Annex B limit the upstream carriers to 32. In accordance with one embodiment, the invention increases the upstream carriers to greater than 32. In one embodiment, 64 upstream carriers are possible. The increase in data rate can be achieved by modifying the PSD mask as proposed in ADSL+. Various modifications to the initialization and training sequence to be further adopted. In another embodiment, the downstream data rate is also increased to up 512 downstream subchannels.

In CS-021, an ADSL+ system is proposed which extends the downstream band from 1.104 MHz for regular G.992.1 downstream to 2.208 MHz. However, this increases the asymmetry between downstream and upstream data rates. One embodiment of the invention also proposes to increase the downstream bandwidth, achieving high downstream rates for at least short and medium loops. The present invention produces an increase in the upstream bandwidth to 64 upstream subchannels without significant decrease in downstream data rates for short loops. Hence this document proposes additional changes to the ADSL+ over POTS.

2.1 ADSL.enh Operation

To indicate that a transceiver supports and wishes to train in ADSL.enh mode a G.hs code point needs to be defined.

2.2 Mask Selection

Two different masks are proposed for upstream ADSL.enh (see Section 4). The supported and selected masks should be indicated using code points.

3 Initialization

It is proposed to use definitions as defined for ADSL+ over ISDN for ADSL.enh over POTS.

3.1 NSCus

G.dmt.bis and G.lite.bis where the number of subchannels is referenced, the variable NSCus has been consistently used in all places. As for AnnexB, since the use of 64 subchannels is optional, hence no additional changes are required. The changes in initialization and training sequences are implicitly adapted by using NSCus=64 in all relevant sections.

3.2 R-REVERB1

The R-REVERB PRBS [2, p. 82] repeats every 64 samples which corresponds to 32 subchannels. For systems more than 32 subchannels, the result is repetition across a number of the subchannels which can potentially create undesirable effects. As such, ADSL.enh proposes the data pattern modulated on an R-REVERB symbol shall be the pseudo-random upstream sequence (PRU), $d_n$ for n=1 to 128, defined as follows:

$$d_n = 1 \quad \text{for } n = 1 \text{ to } 7$$
$$= d_{n-6} \oplus d_{n-7} \quad \text{for } n = 8 \text{ to } 128$$

The bits shall be used as follows: the first pair of bits ($d_1$ and $d_2$) is used for the DC and Nyquist subcarriers (so the bits are effectively ignored); then the first and second bits of subsequent pairs are used to define the $X_i$ and $Y_i$ for i=1 to 63 for C-REVERB symbols.

3.3 Power Cutback Mechanism

Power cutback serves the purposes of preventing saturation at the receiver for short loops and limiting unnecessary interference (crosstalk) to neighboring loops. Because ADSL.enh uses a shaped PSD, the definition of power cutback is better served by defining it as a ceiling on the transmit PSD.

Figure 1:
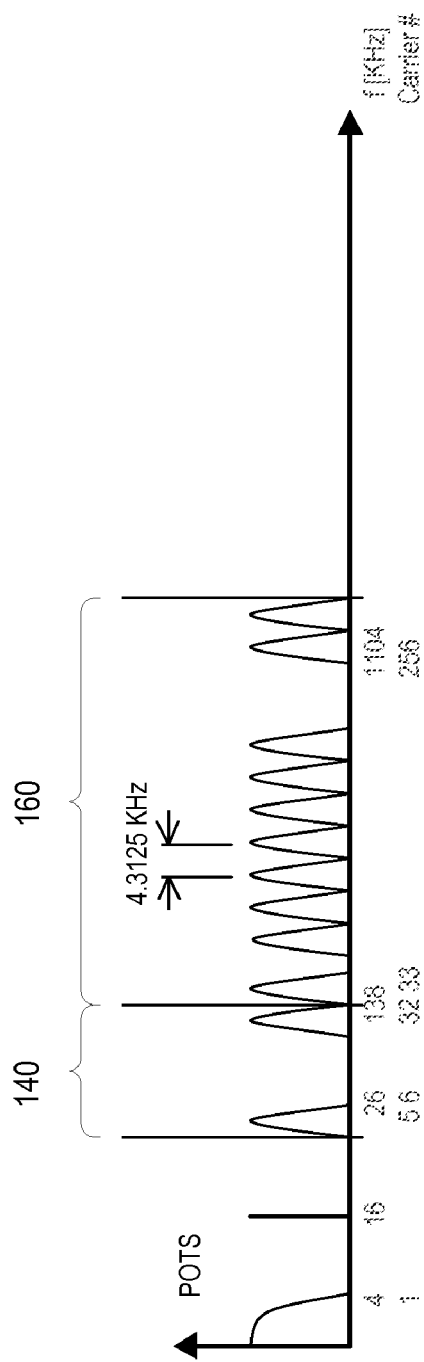
FIGS. 1-2 show frequency spectra of conventional ADSL systems.
Figure 2:
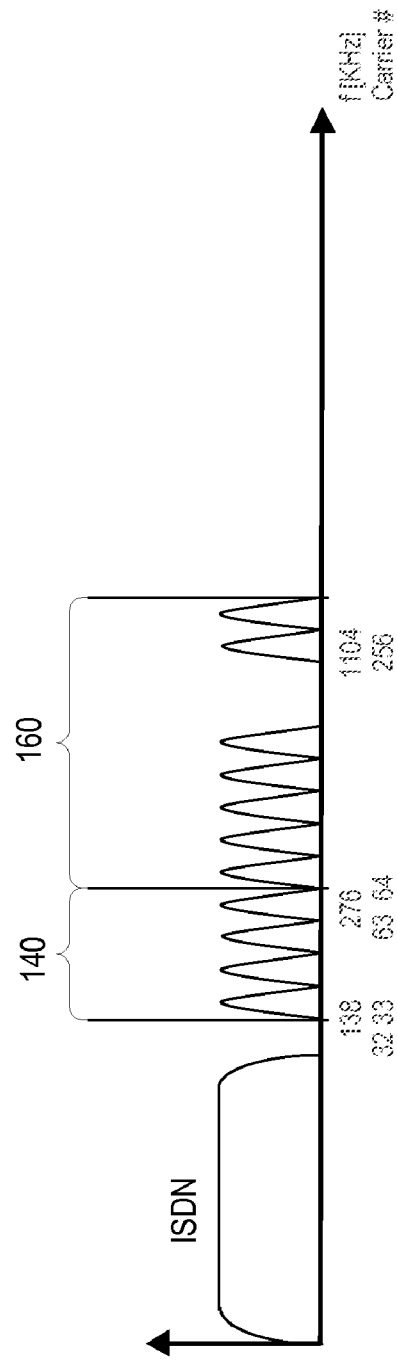

Section 4.3 explicitly defines the relationship between the mask, nominal transmit PSD, reference PSD, and power cutback. For clarity, these are also illustrated in FIG. 1 using ADSL.enh mask U1, a nominal transmit level 3.5 dB below the mask, and a power cutback of 6 dB.

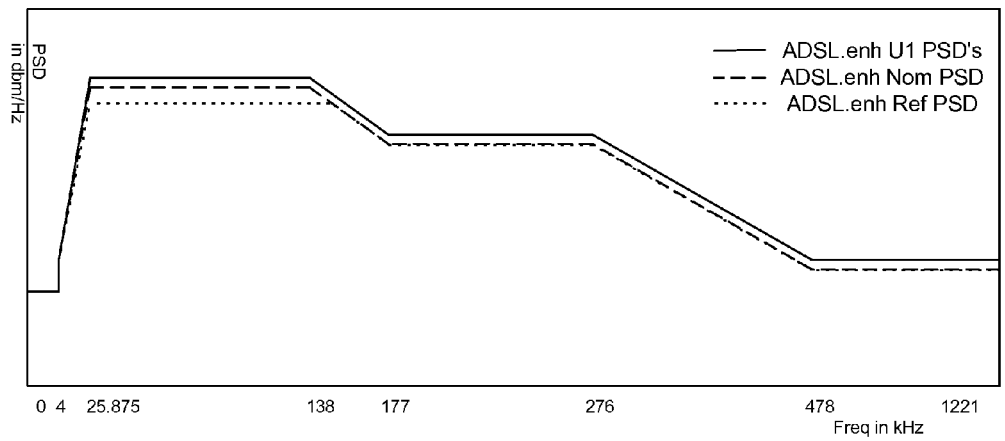

4 ADSL.enh Over POTS PSD Specification 4.1 ATU-R Control Parameter Settings

The parameters applicable to ADSL.enh mask U1 are shown in table 1.

TABLE 1

ADSL.enh Mask U1 parameters.

| Parameter | Setting | Characteristics |
|---|---|---|
| NSCus | 64 | Number of downstream subchannels. |
| NOMPSDus | −38.5 dBm/Hz | This may be changed during G.hs. |
| MAXATPus | 12.5 dBm | This may be changed during G.hs. |

The parameters applicable to ADSL.enh mask U2 are shown in table 2.

TABLE 2

ADSL.enh Mask U2 parameters.

| Parameter | Setting | Characteristics |
|---|---|---|
| NSCus | 64 | Number of downstream subchannels. |
| NOMPSDus | −38 dBm/Hz | This may be changed during G.hs. |
| MAXATPus | 12.9 dBm | This may be changed during G.hs. |

4.2 ATU-R Upstream Transmit Mask

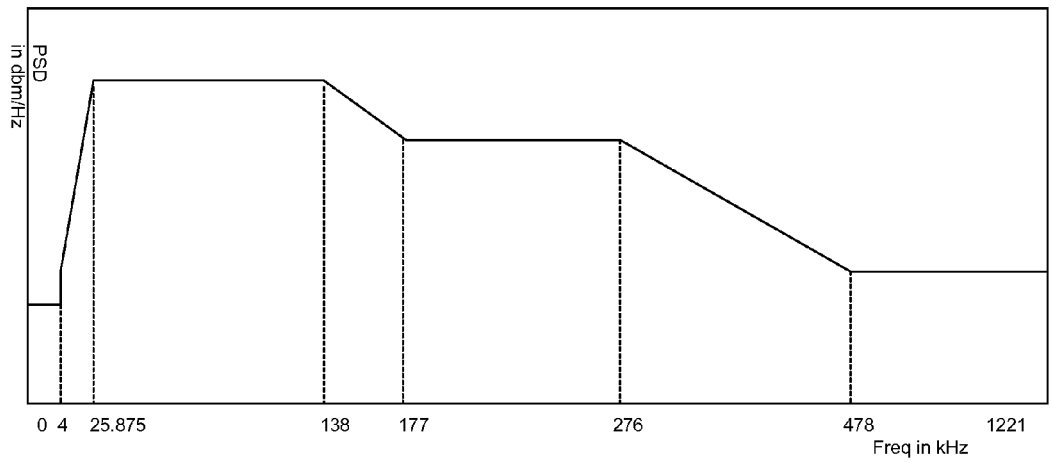
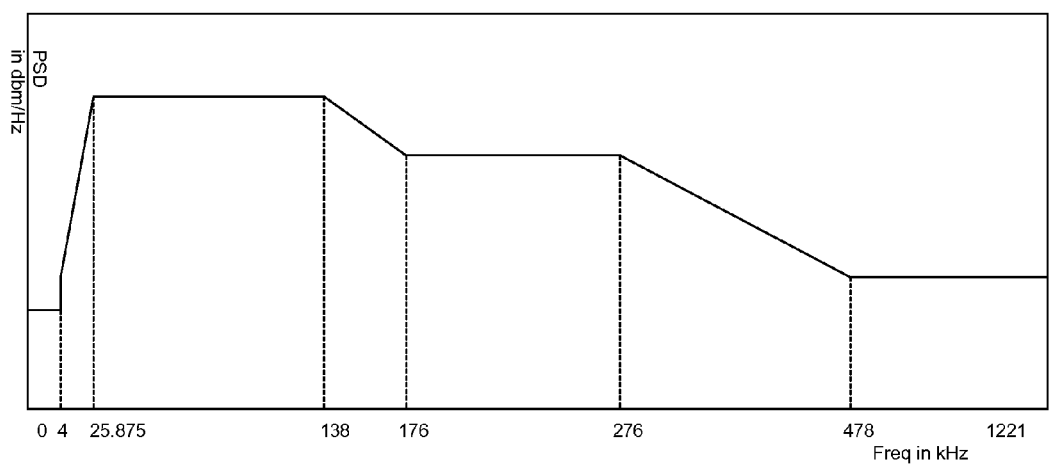

| Mask Plan U1 | |
|---|---|
| Frequency band f (kHz) | Equation for line (dBm/Hertz) |
| 0 < f < 4 | −97.5, with max power in the in 0-4 kHz band of +15 dBrn |
| 4 < f < 25.875 | −92.5 + 21.5 × $\log_2(f/4)$ |
| 25.875 < f < 138 | −34.5 |
| 138 < f < 177.7 | −34.5 − 48 × $\log_2(f/138)$ |
| 177.7 < f < 276 | −52 |
| 276 < f < 477.8 | −52 − 48 × $\log_2(f/276)$ |
| 477.8 < f < 1221 | −90 |
| 1221 < f < 1630 | −90 peak, with max power in the [f, f + 1 MHz] window of (−90 − 48 × $\log_2(f/1\,221)$ + 60) dBm |
| 1630 < f < 11040 | −90 peak, with max power in the [f, f + 1 MHz] window of −50 dBm |

| Mask Plan U2 | |
|---|---|
| Frequency band f (kHz) | Equation for line (dBm/Hertz) |
| 0 < f < 4 | −97.5, with max power in the in 0-4 kHz band of +15 dBrn |
| 4 < f < 25.875 | −92.5 + 21.5 × $\log_2(f/4)$ |
| 25.875 < f < 138 | −35 |
| 138 < f < 176.81 | −35 − 48 × $\log_2(f/138)$ |
| 176.81 < f < 276 | −52.0 |
| 276 < f < 478.6875 | −52 − 48 × $\log_2(f/276)$ |
| 478.6875 < f < 1221 | −90 |
| 1221 < f < 1630 | −90 peak, with max power in the [f, f + 1 MHz] window of (−90 − 48 × $\log_2(f/1\,221)$ + 60) dBm |
| 1630 < f < 11040 | −90 peak, with max power in the [f, f + 1 MHz] window of −50 dBm |

4.3 Passband PSD and Response

Across the whole passband, the transmit PSD level shall not exceed the maximum passband transmit PSDlevel, defined as:

NOMPSDus+1 dB, for initialization signals up to and including the Channel Discovery Phase;

REFPSDus+1 dB, during the remainder of initialization, starting with the Transceiver Training Phase;

MAXPSDus−PCBus+3.5 dB, during showtime.

4.4 ATU-C Related Downstream Settings

It is proposed that for the downstream control settings and related PSD masks, the ADSL+ over ISDN settings from the Segment 6.1 and 6.2 of CS-021 document to be taken over for ADSL.enh over POTS.

Summary:

ADSL.enh proposes to extend the upstream data rates for ADSL+ and a modification of the PSD masks. Various implications and some modifications to the initialization and training sequence to be further adopted. It is proposed that the committee agree to the following items:

1. With ADSL.enh, defining a high upstream data rate with 64 subchannels along with the proposed high rate downstream with 512 subchannels.

2. Add code points to G.hs to support the indication and selection of ADSL.enh as an option, and for the selection of the desired PSD mask.

3. Change the following items in initialization according to Section 3:
   3.1. C-REVERB definition.
   3.2. Power cutback mechanism.

4. Adopt the downstream ADSL+ over POTS PSD specification in Section 4.

5 REFERENCES

[1] T. Cole (ed.), "G.lite-bis: draft recommendation," ITU-T Study Group 15 Question 4, FC-R18R1, December 2001.

[2] F. van der Putten (ed.), "G.dmt.bis: draft recommendation G.dmt.bis," ITU-T Study Group 15 Question 4, CS-R17, December 2001.

[3] Q. Wang (ed.), "Very-high-bit-rate digital subscriber line (VDSL) metallic interface part 1: functional requirements and common specification," T1E1.4/2002-031R1, February. 2002.

[4] A. Redfern, "G.gen: G.dmt.bis: G.lite.bis: ADSL+ CS-021", March 2002.

The invention claimed is:

1. An asymmetrical digital subscriber line system comprising:

an asymmetrical digital subscriber line transceiver operable to transmit and receive over a frequency spectrum, the frequency spectrum having a data transmission band from frequency $F_{U0}$ to frequency $F_{DE}$, the data transmission band including a first section from frequency $F_{U0}$ to frequency $F_{UE}$ for transmitting upstream data and a second section from frequency $F_{D0}$ to frequency $F_{DE}$ for transmitting downstream data, the first section having a first subsection from frequency $F_{U0}$ to frequency $F_{U1}$ and comprising a channels and a second subsection from frequency $F_{U1}$ to frequency $F_{UE}$, wherein $F_{U0} < F_{U1} < F_{UE} \leq F_{D0} < F_{DE}$;

the data transmission in the first subsection has a first power spectral density, the data transmission in the second subsection has a second power spectral density lower than the first power spectral density, and the data transmission in the second section has a third power spectral density lower than the second power spectral density.

2. The asymmetrical digital subscriber line system of claim 1, wherein the second section has a third subsection from frequency $F_{D0}$ to frequency $F_{D1}$ and a fourth subsection from frequency $F_{D1}$ to frequency $F_{DE}$, the fourth subsection comprising y channels, thereby increasing downstream data transmission rate, and the second subsection comprises x channels, where $x \geq 1$, thereby increasing upstream data transmission rate.

3. The asymmetrical digital subscriber line system of claim 2, wherein $F_{D1}$ is equal to about the end of the data transmission band for conventional asymmetrical digital subscriber line systems, and y is >1.

4. The asymmetrical digital subscriber line system of claim 1, wherein $F_{U0}$ is from the end of the POTS spectrum or the ISDN spectrum.

5. The asymmetrical digital subscriber line system of claim 4, wherein $F_{U1}$ and the second subsection are contiguous.

6. The asymmetrical digital subscriber line system of claim 1 further comprising an echo cancellation mode for downstream data transmission.

7. The asymmetrical digital subscriber line system of claim 6, wherein the echo cancellation mode for downstream data transmission comprises transmitting downstream data in the first and second sections.

8. The asymmetrical digital subscriber line system of claim 1 further comprising a partial echo cancellation mode for downstream data transmission.

9. The asymmetrical digital subscriber line system of claim 8, wherein the partial echo cancellation mode for downstream data transmission comprises transmitting downstream data in the second subsection of the first section and the second section.

10. The asymmetrical digital subscriber line system of claim 1, wherein the data transmission band has improved data transmission rates for both upstream data transmission and downstream data transmission.

11. The asymmetrical digital subscriber line system of claim 1 wherein the asymmetrical digital subscriber line transceiver is further operable to generate and/or receive a handshake including at least one of code points.

12. The asymmetrical digital subscriber line system of claim 11 wherein the asymmetrical digital subscriber line transceiver is further operable to select the first power spectral density, the second power spectral density and the third power spectral density depending on the at least one of code points.

13. The asymmetrical digital subscriber line system of claim 11 wherein the asymmetrical digital subscriber line transceiver is further operable to select $F_{UE}$ and/or $F_{D0}$ depending on the at least one of code points.

14. A method for transmitting and receiving data within a frequency band in an asymmetrical digital subscriber line system, the method comprising:
    transmitting data in an upstream direction using a first frequency section within the frequency band having first and second subsections, wherein the first subsection has an upper frequency equal to about the upper frequency of conventional asymmetrical digital subscriber line systems and the second subsection beginning at a frequency greater than about the upper frequency of the first subsection;
    transmitting data in a downstream direction using a second frequency section;
    the data transmission in the first subsection having a first power spectral density,
    the data transmission in the second subsection having a second power spectral density lower than the first power spectral density, and
    the data transmission in the second frequency section having a third power spectral density lower than the second power spectral density.

15. The method as claimed in claim 14, wherein the first frequency section is between frequency $F_{U0}$ and frequency $F_{UE}$, the first subsection is from frequency $F_{U0}$ to frequency $F_{U1}$ comprising a channels; and the second subsection is from frequency $F_{U1}$ to frequency $F_{UE}$.

16. The method as claimed in claim 15, wherein transmitting data in the downstream direction is between frequency $F_{D0}$ and frequency $F_{DE}$, wherein $F_{U0}<F_{U1}<F_{UE}\leq F_{D0}<F_{DE}$.

17. The method as claimed in claim 15, wherein the second frequency section has a third subsection from frequency $F_{D0}$ to frequency $F_{D1}$ and a fourth subsection from frequency $F_{D1}$ to frequency $F_{DE}$, the fourth subsection comprising y channels, thereby increasing downstream data transmission rate.

18. The method as claimed in claim 15, wherein the second subsection comprises x channels, where $x \geq 1$, thereby increasing upstream data transmission rate.

19. The method as claimed in claim 14, wherein the frequency band has improved data transmission rates for both upstream data transmission and downstream data transmission.

20. An asymmetrical digital subscriber line transceiver operable to transmit and receive over a frequency spectrum,
    wherein the transceiver, comprising a transmitter and a receiver, is adapted to transmit the frequency spectrum having a data transmission band from frequency $F_{U0}$ to frequency $F_{DE}$, the data transmission band including a first section from frequency $F_{U0}$ to frequency $F_{UE}$ for transmitting upstream data and a second section from frequency $F_{D0}$ to frequency $F_{DE}$ for transmitting downstream data, the first section having a first subsection from frequency $F_{U0}$ to frequency $F_{U1}$ and comprising a channels and a second subsection from frequency $F_{U1}$ to frequency $F_{UE}$, wherein $F_{U0}<F_{U1}<F_{UE}\leq F_{D0}<F_{DE}$;
    wherein the transmitter is adapted to transmit in the first subsection with a first power spectral density,
    wherein the transmitter is adapted to transmit in the second subsection with a second power spectral density lower than the first power spectral density, and
    wherein the receiver is adapted to receive in the second section with a third power spectral density lower than the second power spectral density.

21. The asymmetrical digital subscriber line transceiver of claim 20, wherein the second section has a third subsection from frequency $F_{D0}$ to frequency $F_{D1}$ and a fourth subsection from frequency $F_{D1}$ to frequency $F_{DE}$, the fourth subsection comprising y channels, thereby increasing downstream data transmission rate, and
    the second subsection comprises x channels, where $x \geq 1$, thereby increasing upstream data transmission rate.

22. The asymmetrical digital subscriber line transceiver or claim 21, wherein $F_{D1}$ is equal to about the end of the data transmission band for conventional asymmetrical digital subscriber line systems, and y is >1.

23. The asymmetrical digital subscriber line transceiver of claim 20, wherein $F_{U0}$ is from the end of the POTS spectrum or the ISDN spectrum.

24. The asymmetrical digital subscriber line transceiver of claim 23, wherein $F_{U1}$ and the second subsection are contiguous.

25. The asymmetrical digital subscriber line transceiver of claim 20 further comprising an echo cancellation mode for downstream data transmission.

26. The asymmetrical digital subscriber line transceiver of claim 25, wherein the echo cancellation mode for downstream data transmission comprises transmitting downstream data in the first and second sections.

27. The asymmetrical digital subscriber line transceiver of claim 20 further comprising a partial echo cancellation mode for downstream data transmission.

28. The asymmetrical digital subscriber line transceiver of claim 27, wherein the partial echo cancellation mode for downstream data transmission comprises transmitting downstream data in the second subsection of the first section and the second section.

29. The asymmetrical digital subscriber line transceiver of claim 20, wherein the data transmission band has improved data transmission rates for both upstream data transmission and downstream data transmission.

* * * * *

UNITED STATES PATENT AND TRADEMARK OFFICE
CERTIFICATE OF CORRECTION

PATENT NO. : 7,486,723 B2
APPLICATION NO. : 11/696735
DATED : February 3, 2009
INVENTOR(S) : Raj Kumar Jain It is certified that error appears in the above-identified patent and that said Letters Patent is hereby corrected as shown below:

In Column 1, Line 16-17 - "to asymmetrical digital subscriber line systems." should read -- to asymmetrical digital subscriber line systems (ADSL). --

In Column 1, Line 55 - "Nyguist" should read -- Nyquist --

In Column 2, Line 49 - "(for ADL systems)" should read -- (for ADSL systems) --

Column 2, Line 57-58 - "For example, a is equal to 26 for POTS and 32 for ADL and ISDN services." should read -- For example, a is equal to 26 for POTS and 32 for ADSL and ISDN services.

In Column 2, Line 61 - "a+x ends at a frequency" should read -- a+x ends at a frequency --

In Column 3, Line 14, "2z" should read -- $2^Z$ --

In Column 3, Line 16, "29" should read -- $2^9$ --

In Column 3, Line 67, "120 kHz for ISDN, or 0 for ADL" should read -- 120 kHz for ISDN, or 0 for ADSL --

In Column 4, Table 1 - "WITH POTS SERVICES WITH X=32 CHANNELS" should read -- WITH POTS SERVICES WITH x=32 CHANNELS --

In Column 4, Table 2 - "WITH POTS SERVICES WITH X=32 CHANNELS" should read -- WITH POTS SERVICES WITH x=32 CHANNELS --

UNITED STATES PATENT AND TRADEMARK OFFICE
CERTIFICATE OF CORRECTION

PATENT NO. : 7,486,723 B2
APPLICATION NO. : 11/696735
DATED : February 3, 2009
INVENTOR(S) : Raj Kumar Jain It is certified that error appears in the above-identified patent and that said Letters Patent is hereby corrected as shown below:

In Column 6, Line 50 - "are also illustrated in FIG. 1 using" should read -- are also illustrated in FIG. A1 using --

Figure in Column 7-8 should be labeled -- FIG. A1 --

In Column 9, Line 4 - "shown in table 1." should read -- shown in table A1 --

In Column 9, Line 6 - "TABLE 1" should read -- TABLE A1 --

In Column 10, Line 2 - "shown in table 2" should read -- shown in table A2 --

In Column 10, Line 5 - "TABLE 2" should read -- TABLE A2 --

In Column 13, Line 8 - "+15 dBrn" should read -- +15 dBm --

In Column 13, Line 27 - "+15 dBrn" should read -- +15 dBm

In Column 16, Line 15 - "to frequency $F_{U1}$ and comprising a" should read -- to frequency $F_{U1}$ and comprising *a* --

Signed and Sealed this

Fourth Day of August, 2009

JOHN DOLL
*Acting Director of the United States Patent and Trademark Office*